April 6, 1943.     J. MIHALYI     2,315,977
DEPTH OF FIELD INDICATOR FOR CAMERAS
Filed June 7, 1941
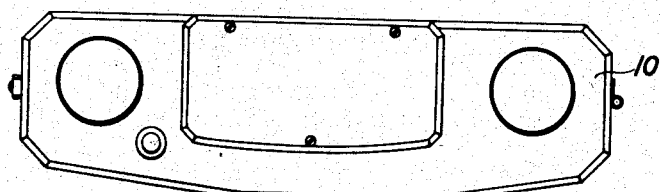
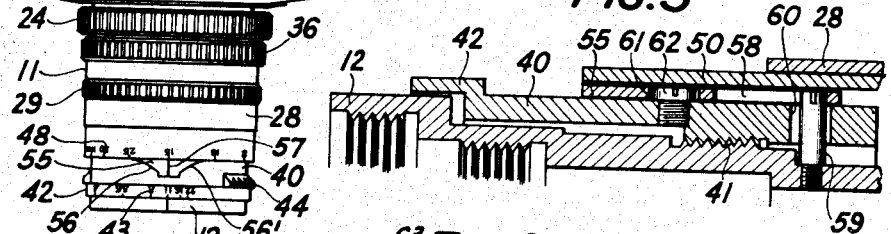
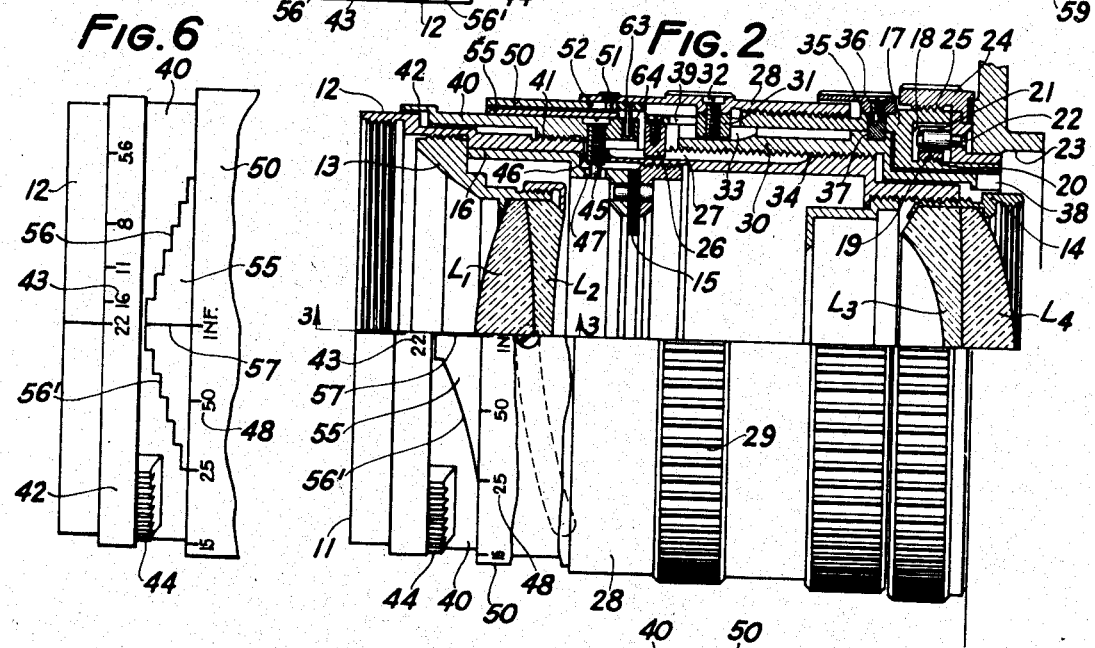
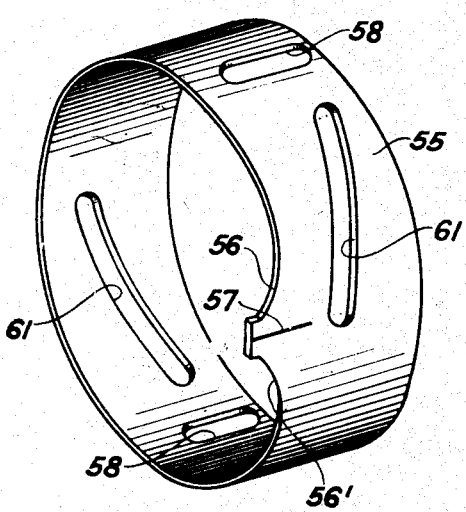
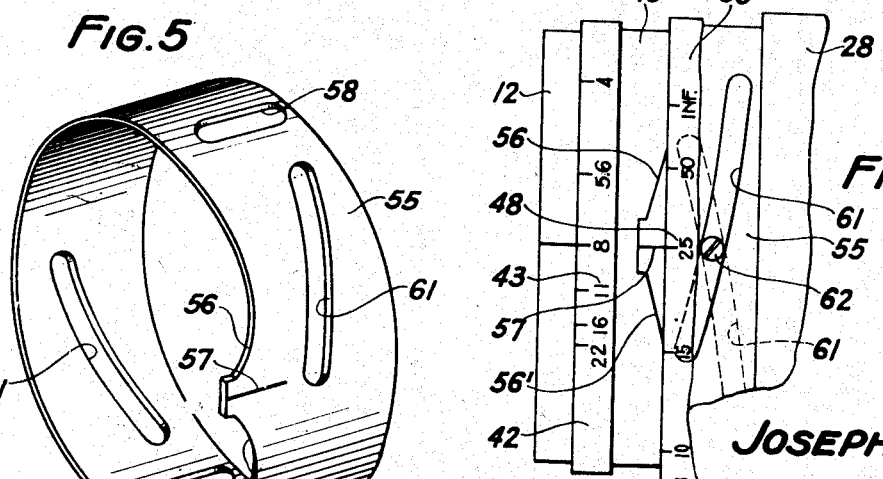
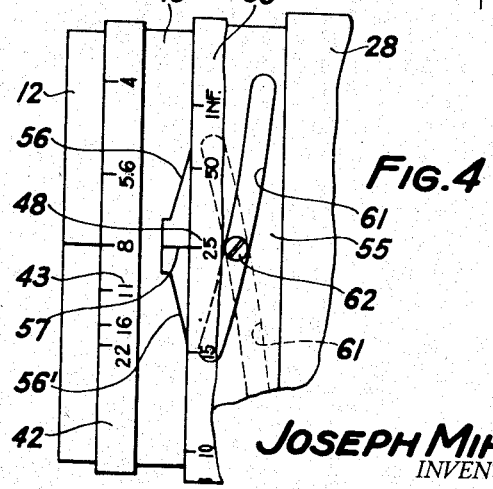
JOSEPH MIHALYI
INVENTOR
BY
ATTORNEYS Patented Apr. 6, 1943

2,315,977

UNITED STATES PATENT OFFICE 2,315,977

DEPTH OF FIELD INDICATOR FOR CAMERAS

Joseph Mihalyi, Rochester, N. Y., assignor to Eastman Kodak Company, Rochester, N. Y., a corporation of New Jersey Application June 7, 1941, Serial No. 397,088

3 Claims. (Cl. 95—44)

The present invention relates to a focusing mechanism for cameras, and particularly to a depth of field indicator which will show directly on the focusing scale the depth of field of the lens for different diaphragm settings and different adjustments of focus.

It is well known to those skilled in the art that the depth of field or any given focal length lens varies not only with the size of diaphragm opening but also with the focus adjustment of the lens. By depth of field of a lens is meant the range of definition of the lens, or the distances of the nearest and farthest objects from the focal plane of the lens which will be in sharp focus.

Information as to the depth of field of a lens is oft times invaluable to a photographer. For instance, if a photographer wishes to include certain objects spaced apart axially of the optical axis of a lens in a picture to be sure they are in focus, without benefit of ground glass focusing, he must know what diaphragm opening at a given focus will give him the desired depth of field. Furthermore, if the lighting conditions are such that there is no choice as to what diaphragm opening can be used to obtain proper exposure then the photographer must know what focus he must use to obtain the desired depth of field.

Many depth of field calculating arrangements have heretofore been provided for indicating what depth of field exists for different ranges of focus and diaphragm settings, and for aiding a photographer in choosing the proper ranges of focus and diaphragm openings to obtain desired depths of field. Certain of these depth of field indicators comprise two relatively movable scales based on ranges and diaphragm settings for a given lens which are in no way connected to the focusing mechanism of the lens, but are in reality merely calculators. Those known depth of field indicators which are associated with the focusing mechanism of the lens have either the focusing scale or the depth of field scale connected to the focusing mechanism or diaphragm operating mechanism, respectively, to be moved over the other scale which is stationary, instead of having each scale movable relative to the other in response to adjustment of the mechanism it is related to. These indicators are in reality no more than calculators because two spaced indices on the depth of field scale must be checked across two corresponding range indices on the focusing scale.

Therefore, one object of the present invention is the provision of a depth of field indicator which gives a direct reading of the depth of field for any focus adjustment and diaphragm setting of a lens without requiring calculation of any sort or the comparison of indices on two relatively movable scales.

Another object is to provide a depth of field indicator in which the diaphragm setting and focus adjustment for any given depth of field is indicated directly without calculation of any kind or without requiring reference to two or more scales.

A further object is the provision of a depth of field indicator in which the depth of field scale is connected to and moved by the diaphragm operating mechanism in cooperation with the focusing scale which is moved relative to the depth of field scale by adjustment of the focusing mechanism, whereby the indicated depth of field is properly altered by either a change in the diaphragm setting, by a change in the focus adjustment of the lens, or by the combination of both.

And yet another object is the provision of a depth of field indicator which comprises a movable depth of field member having thereon a depth of field scale comprising a pair of curves disposed symmetrically on opposite sides of a given point, and based on the depth of field of the lens for different diaphragm settings and different focus adjustments of the lens, said members being arranged so that the depth of field scale is in overlapping relation to and embraces a movable focusing scale to cooperate therewith; in which the depth of field member is connected to the diaphragm operating ring so that the depth of field scale will be moved transversely of the focusing scale by adjustment of the diaphragm.

And yet another object is to provide a depth of field indicator which is particularly adapted for use with a focusing lens mount, and appears to form a part of said mount when incorporated thereon.

And another object is to provide a depth of field indicator which is cheap to manufacture, simple and efficient in construction and operation, gives direct readings of focus, diaphragm settings, and depth of field which require no calculations or cross reference of two or more scales.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which, Fig. 1 is a top plan view of camera equipped with a focusing lens mount incorporating a depth of field indicator constructed in accordance with one embodiment of the present invention, Fig. 2 is an enlarged top plan view, partly in section and partly in elevation, of the lens mount shown in Fig. 1, showing the construction of my novel depth of field indicator, Fig. 3 is an enlarged partial sectional view taken substantially on line 3—3 of Fig. 2, and showing the relative positions of the parts making up my novel depth of field indicator and the connection between the depth of field ring and the diaphragm operating ring, Fig. 4 is a top plan view of the forward end of the lens mount with a portion of the focusing ring broken away to show the pin and slot connection between the diaphragm operating member and the depth of field ring. The depth of focus member is shown having a modified form of depth of field scale thereon, or straight lines as distinguished from curved lines shown in Fig. 5, Fig. 5 is a perspective view of the depth of field ring removed from the mount, and Fig. 6 is a view similar to Fig. 4, showing another modification in the contour of the depth of field scale on the depth of field member.

Like reference characters refer to corresponding parts throughout the drawing.

Generally speaking, the present invention relates to a depth of field indicator which is operatively associated with the focusing mechanism of a camera lens in such a way that it is adjusted by a focusing movement of the lens and/or an adjustment of the lens diaphragm to give a direct reading of the depth of field of the lens in accordance with either one or both of these adjustments. In its broadest aspects this depth of field indicator comprises a depth of field member bearing two curves, based on the depth of field of a lens with different diaphragm settings and different focus adjustments of the lens, disposed symmetrically on opposite sides of a given point. This depth of field member is mounted in overlapping relation with a movable focusing scale so that it embraces a given length of said scale and cooperates therewith to give a depth of field reading. The depth of field member is limited to movement transversely of the focusing scale and is connected to the diaphragm operating member to be moved relative to the focusing scale by an adjustment of the diaphragm.

It is pointed out that this depth of field indicator is herein shown in conjunction with a focusing lens mount merely for illustrative purposes and because of its ready adaptation to such an application, and that the broad idea is not limited to the specific application shown, or even to the application of the depth of field indicator on a focusing lens mount. It is conceivable that the relative movement and cooperation of the depth of field scale and the focusing scale disclosed hereinafter could be readily obtained on a folding camera, or the like, not having a focusing lens mount but in which focusing was done by moving the camera lens along a carriage relative to the focal plane of a camera for focusing purposes. Referring now to the drawing, Fig. 1 shows a camera 10 of the miniature type having a focusing lens mount 11, incorporating a depth of field indicator constructed in accordance with one embodiment of the present invention, detachably mounted on the front wall thereof. Referring to Fig. 2, the focusing lens mount 11 may comprise a lens barrel 12 in which two sets of lenses $L_1L_2$, $L_3L_4$ carried by lens cells 13 and 14, respectively, are fixed in spaced relation by screwing the cells into place within the lens barrel. Located within a lens barrel between the two sets of lenses $L_1L_2$, $L_3L_4$ is an adjustable diaphragm 15 of well-known construction which may be adjusted by rotating the ring 16 forming a part thereof, as is well known in the art.

The lens mount includes a stationary supporting sleeve 17 provided with a recess 18 extending around the rear end thereof. A locating ring 19 is threaded into the annular recess 18, as shown at 20, and includes a notch 21 which is adapted to receive a locating pin 22 extending from the front wall of the camera 10 adjacent the lens opening 23 therein. The engagement of this locating pin with the locating notch insures the lens being mounted on the camera in a given position before it can be attached to the camera so that the range finder cam associated with the focusing mechanism of the lens mount, as set forth hereinafter, will properly cooperate with a range finder adjusting mechanism, not shown, in the camera body. The locating ring 19 is threaded in position so that it can be adjusted circumferentially of the mount to account for inaccuracies in construction, and after once being properly adjusted is staked against movement. The lens mount is attached to the camera body by the threaded attaching ring 24, rotatably mounted on the front wall of the camera, engaging a thread 25 on the periphery of the rear end of the supporting sleeve 17, as is well known.

The lens mount is focused by turning the focusing ring 28 which is threaded on the outside of the supporting sleeve, said ring being provided with a knurled flange 29 to facilitate the focusing adjustment. The focusing ring 28 is connected to an internally threaded focusing tube 30 by a key 31 attached to the former by a screw 32 engagement with and extending through an annular slot 39 in the sleeve 17 and into an axial slot 33 in the tube. The focusing tube is in threaded engagement with a thread on the exterior of the lens barrel, as shown at 34, and these threads are of multiple pitch so that the focusing ring need move only through a part of one revolution to give the entire focusing range of the lens.

The focusing tube 30 is held against axial movement, but permitted to rotate, by the engagement of a key 35 fixed to the under side of a cover ring 36 on the outside of the sleeve 17 with an annular groove 37 in the focusing tube. The rear end of the focusing tube may terminate in an axial range finder adjusting cam 38 which is set to engage and actuate the range finder adjusting linkage, not shown, in the camera body when the lens is focused. From the above description it will be appreciated that upon rotation of the focusing ring 28 the focusing tube 30 is rotated, and since this tube is held against axial movement the lens barrel is moved axially for focusing purposes by virtue of the multiple pitch threaded engagement between the tube and the lens barrel. The lens barrel is held against rotation by the key 26 fixed to the sleeve 17 extending into the axial slot 27 in the periphery of the barrel.

The diaphragm is adapted to be adjusted by turning the diaphragm operating ring 40 threaded onto the lens barrel at 41. The forward end of the diaphragm operating ring terminates in a flange 42 overhanging the front of the lens barrel and on the outer face of which is provided a diaphragm setting scale 43 cooperating with an index on the lens barrel adjacent thereto. The diaphragm operating ring 40 may be provided with one or more finger-pieces 44 to facilitate adjustment of said ring. The diaphragm operating ring is connected to the rotatable ring 16 of the diaphragm by a screw 45 fixed thereto and extending through an arcuate slot 46 in the lens barrel to engage an aperture 47 in the ring 16.

The focusing mechanism and diaphragm adjusting mechanism of the lens mount set forth up to this point is well known in the art, and forms no part of the present invention except insofar as said invention depends upon the function and relative movement of certain parts thereof for its operation. Coming now to the present invention, a supplemental focusing ring 50 is connected to the forward end of the main focusing ring 28 by a screw 51 extending from the latter engaging an axial slot 52 in the former. This pin and slot connection causes the supplemental focusing ring to rotate with the main focusing ring but permits relative axial movement between the two. The forward end of the supplemental focusing ring includes a focusing scale 48 extending circumferentially of the same. This supplemental focusing ring 50 is required because with the depth of focus indicator to be described it is necessary that there be no relative axial movement of the member carrying the focusing scale during the focusing movement of the lens and the depth of field member. With the focusing ring 28 threaded to the sleeve 17 as shown there will be a certain amount of axial movement of the focusing ring 28 when the same is turned for focusing. I overcome this result by the use of the supplemental focusing ring 50 and its particular connection to the main focusing ring 28.

The main and supplemental focusing rings 28 and 50, respectively, are in effect one member because they rotate together, and which movement is the primary movement of the focusing ring, and can be properly referred to as one member, or the focusing member. It is only the particular threaded connection of the focusing ring 28 to the lens mount which necessitates the use of this supplemental focusing ring to overcome axial movement of the focusing scale during the focusing movement of the lens. If the focusing ring 28 was connected to the mount in any one of a number of different ways so that no axial movement thereof was incident to its rotation, or the axial movement thereof was equal to that of the lens barrel, then the forward end of the focusing ring 28 could be extended and the supplemental focusing ring 50 could be omitted. For instance, if the focusing ring 28 were connected to the sleeve 17 by a pin and annular slot connection, rather than a thread, as shown, the focusing ring would not tend to move axially during rotation of the same. Further, if the threaded connection between the focusing ring 28 and the sleeve 17 was equal in pitch to the threaded connection between the lens barrel 12 and the focusing tube 30, then there would be no relative axial movement between the focusing ring 28 and the lens barrel 12 during focusing adjustment of the lens and the focusing ring 28 proper could be extended to replace the supplemental focusing ring 50.

Encircling the diaphragm operating ring 40, and underlying the supplemental focusing ring 50, is a movable depth of field ring 55 of the form best shown in Fig. 5. This depth of field ring includes a depth of field scale which comprises two curves 56 and 56' symmetrically disposed on opposite sides of a fixed index 57, which index, in the embodiment shown, cooperates with the focusing scale 48 to indicate the focus adjustment of the lens. The depth of field ring is provided with two diametrically disposed axial slots 58 which are adapted to receive the heads of screws 59 fixed to the lens barrel 12 for the purpose of preventing rotation of the depth of scale ring and permitting it to move axially of the mount, see Figs. 3 and 5. It will be noticed that the screws 59 pass through circumferential slots 60 in the diaphragm operating ring 40 to prevent axial movement of the same relative to the lens barrel 12.

Referring to Fig. 4 it will be noticed that the focusing scale 48 overlaps the depth of field scale on the depth of field ring 55, and that a given length of the focusing scale is embraced by the two curves 56 and 56' constituting said depth of field scale. The focusing scale, as is usual practice, is logarithmic and the amount of the same embraced by the curves 56 and 56' indicates the nearest and farthest points of the field of the lens which are in focus at any given time. As is well known, the depth of field of the lens will vary with different ranges of focus. This is accounted for by rotating of the focusing scale 48 over the depth of field scale during focusing. The depth of field also varies with the diaphragm settings of the lens. To account for different diaphragm settings, the depth of field ring is moved axially of the focusing scale by rotation of the diaphragm operating ring 40 with the result that different lengths of the focusing scale will be embraced depending upon the diaphragm being used.

This axial movement of the depth of scale ring is provided for by a connection between the diaphragm operating ring 40 and the depth of field ring 55 including inclined slots 61 in the depth of field ring adapted to be engaged by the heads of the screws 62 fixed to the diaphragm operating ring, see Figs. 3 and 5. Due to this construction, when the diaphragm operating ring is rotated to change the diaphragm settings, the depth of field ring is moved axially relative to the focusing scale so that the curves 56 and 56' thereon will embrace different lengths of the focusing scale in accordance with the diaphragm adjustment. The depth of field ring 55 is shown equipped with two diametrically disposed inclined slots 61 for the purpose of preventing a binding action between the depth of field member and the diaphragm operating ring which might be incident to the provision of only one pin-and-slot connection at one side of the ring. A pin 63 fixed to the supplemental focusing ring 50 engages an annular slot 64 in the diaphragm operating ring 40 to permit relative rotation between these two members, but to prevent relative axial movement of the same during adjustment of the diaphragm.

It will be appreciated by one skilled in the art that any given lens will possess definite depth of field characteristics for different combinations of diaphragm settings and ranges of focus. The depth of field scale, or curves 56 and 56' must, therefore, be so formed as to coordinate the several diaphragm and focus adjustments of the lens in order to indicate the proper depth of field for any combination of adjustments. It will be readily understood that the present depth of field indicator shows a different depth of field upon both an adjustment of the diaphragm, or an adjustment of the focusing ring, separately of one another, or upon a combined adjustment of both.

As a preferred embodiment of the invention the depth of field ring has been shown as cut away at all but the front end to provide the depth of field curves 56 and 56' constituting the depth of field scale. With this arrangement, only the flared portion of the ring ever extends beyond the forward end of the focusing ring 50, and a neat unit is the result, see Figs. 1 and 5. It is pointed out, however, that the depth of field ring 55 could, just as well, be the same width throughout and the curves 56 and 56' could be etched thereon. While I have shown the depth of field ring as underlying the focusing scale, it is pointed out that the invention is not limited to such an arrangement. For instance, the depth of scale ring could be made of a transparent plastic material with the scale etched, or scratched, thereon, and in which instance the depth of field ring could overlie the focusing scale 48 to cooperate therewith in the manner set forth. While such an arrangement might not find ready application in a lens mount of the type set forth, it might very well be useful if a depth of field indicator of this type was mounted on a camera bed, or the like, remote from the lens proper to have the depth of field scale overlap the focusing scale and move transversely thereof in the manner set forth.

As will be apparent, the general shape and extent of the scales 56 and 56' will vary with the shape of the inclined slots 61 and the layout of the focusing scale relative to the focusing movement of the lens. For instance, if the focusing scale 48 is contracted more than illustrated, then the curves 56 and 56' would have to be shaped to embrace the corresponding distances on the new scale. Likewise, if the inclination of the slot 61 were altered, the depth of scale member would be moved in, or out, more or less rapidly with a given adjustment of the diaphragm, and the curves 56 and 56' would have to be formed in accordance with such changes.

As will be apparent to those skilled in the art, the curves 56 and 56' do not have to be curved in a strict sense of the word. By proper variation of the inclined slots 61 and the focusing scale 48 the curves 56 and 56' may take the form of straight lines, as indicated in Fig. 4, or may be made as steps, as shown in Fig. 6. When the curves 56 and 56' are in the form of steps as shown in Fig. 6, it is the point of intersection of one tread with the lower end of the riser of the step above which determines the embracing point of the depth of field scale for any given diaphragm adjustment. Referring to Fig. 6, it will be noted that the number of steps is equal to the number of diaphragm settings on the diaphragm scale 43. Therefore, when the depth of field scale is referred to as curves, the term curve is used in the graphical sense, and not as a definition of the shape and form of the scale.

From the above description it will be readily understood that there should be no relative axial movement of the focusing scale and the depth of field scale during the focusing of the mount, otherwise there would be a double correction of the depth of field during focusing, due to rotation and axial movement of the focusing scale over the depth of field scale, which would have to be accounted for in the calibration of the depth of field curve. The use of the supplemental focusing ring 50 and its connection to the focusing ring 28 accounts for the axial movement of the focusing ring 28 due to its particular threaded connection to the sleeve 17. Inasmuch as supplemental focusing ring 50 moves with the focusing ring 28 during the focusing adjustment thereof, or could be entirely eliminated if a given connection of the focusing ring to the mount were provided, as set forth above, these two rings can be considered as one focusing member.

By referring to Fig. 1 it can be seen that at a glance the operator can readily tell the lens is focused at 15 feet, the diaphragm is set at f/11, and the depth of field is 11 to 25 feet under these conditions. When the same lens is adjusted to a diaphragm setting of f/8 and is focused at 25 feet, the depth of field will be 16 to approximately 60 feet, as shown in Fig. 4. As shown in Fig. 6, when the lens is focused at infinity and the diaphragm is set at f/22 everything in the field at 25 feet and beyond will be in focus. One need only be shown a focusing lens mount of the type set forth equipped with my novel depth of field indicator to convince him of the ease of operating and reading the same. By adjusting the mount to different diaphragm settings and ranges of focus one will be impressed with the automatic nature of the device, no calculation or cross referencing of two or more cluttered tables being required to obtain the desired depth of field reading. The simplicity, efficiency, and adaptability of this depth of field indicator will be readily understood and appreciated from the above description of the same. When applied to a focusing lens mount of the type set forth it, in effect, becomes a part of the mount. It could just as readily be applied to any focusing camera by having the focusing scale and the depth of field scale arranged in overlapping relation and connected to the lens focusing mechanism and diaphragm setting mechanism, respectively, so as to be moved relative to each other in the manner set forth above. In other words, the broadest aspect of the present depth of focus indicator could be produced by arranging a flat depth of focus scale and a flat focusing scale in overlapping relation, connecting the focusing scale to the focusing mechanism so that it would be moved in one direction longitudinally of its scale by adjustment thereof, mounting the depth of field scale to move transversely of the direction of movement of the focusing scale, and connecting the same to the diaphragm adjusting mechanism so that it would be moved by an adjustment thereof.

Although I have shown and described certain specific embodiments of my invention, I am aware that many modifications thereof are possible. My invention, therefore, is not to be restricted except insofar as is necessitated by the spirit of the appended claims.

Having thus described my invention, what I claim as new and desire to secure by Letters Patent of the United States is:

1. A focusing lens mount for cameras comprising in combination a lens barrel housing a lens, a rotatable focusing ring for focusing the lens and having a focusing scale extending circumferentially of its periphery, a diaphragm in said lens barrel, a diaphragm operating ring rotatably mounted on said lens barrel and connected to said diaphragm for adjusting the same, a depth of field ring connected to said mount to telescope with said focusing ring and held against rotation, said depth of field ring provided with a depth of field scale comprising a pair of curves, based upon the depth of field of said lens with different diaphragm settings and different focus adjustments of the lens, disposed symmetrically on opposite sides of a given point and adapted to overlap and embrace a length of said focusing scale, and means connecting said depth of field ring to said diaphragm operating ring whereby the former is adapted to be moved axially of the mount to move the depth of field scale transversely of said focusing scale during adjustment of the diaphragm.

2. In a focusing mechanism for cameras the combination with a lens barrel housing a lens, a rotatable focusing ring for focusing the lens and having a focusing scale extending circumferentially of its periphery, a diaphragm in said lens barrel, a diaphragm operating ring rotatably mounted on said lens barrel and connected to said diaphragm for adjusting the same, of a depth of field ring connected to said lens barrel in telescoping relation with said focusing ring and including an index cooperating with said focusing scale, means for mounting said depth of field ring on said mount so that it is adapted to move axially of said lens barrel but is held against rotation thereon, said depth of field ring provided with a depth of field scale comprising a pair of curves disposed symmetrically on opposite sides of said index and based upon the depth of field of said lens with different diaphragm settings and different focus adjustments of the lens, said curves arranged on said depth of field ring so that they overlap and embrace a given length of said focusing scale depending upon the axial position of the depth of field ring relative to said focusing ring, and means connecting said depth of field ring to said lens barrel and diaphragm operating ring to prevent relative axial movement between the depth of field ring and said focusing ring during a focusing adjustment of the lens but causing said depth of field ring to move axially of said focusing ring during adjustment of the diaphragm operating ring whereby the depth of focus scale is moved transversely of the focusing scale.

3. In a focusing mechanism for cameras the combination with a lens barrel housing a lens, a rotatable focusing ring for focusing the lens and having a focusing scale extending circumferentially of its periphery, a diaphragm in said lens barrel, a diaphragm operating ring rotatably mounted on said lens barrel and connected to said diaphragm for adjusting the same, of a depth of field ring encircling said lens barrel and located between the same and said focusing ring, said depth of field ring connected to said barrel to move axially therewith during a focusing adjustment of the lens, a pin and slot connection between said depth of field ring and a non-rotatable part of the focusing mechanism for preventing rotation of said ring, but permitting axial movement of the same relative to said ring, a pin and slot connection between said diaphragm operating ring and said depth of field ring which causes the latter to be moved axially of the focusing member during adjustment of the diaphragm, a fixed index on said depth of field ring cooperating with said focusing scale, and said depth of field ring provided with a depth of field scale comprising a pair of curves disposed symmetrically on opposite sides of said index, based on the depth of field of said lens with different diaphragm settings and different focus adjustments of the lens, adapted to underlie and embrace a given length of said focusing scale depending upon the axial position of the depth of field ring relative to the focusing ring.

JOSEPH MIHALYI.